(12) United States Patent
Tao et al.

(10) Patent No.: US 11,305,436 B2
(45) Date of Patent: Apr. 19, 2022

(54) LATERAL GRIPPER

(71) Applicant: TCTM (HONG KONG) LIMITED, Hong Kong (CN)

(72) Inventors: Chia-Li Tao, Hong Kong (CN); Chien-Chang Chu, Hong Kong (CN)

(73) Assignee: TCTM (HONG KONG) LIMITED, Hong Kong (HK)

( * ) Notice: Subject to any disclaimer, the term of this patent is extended or adjusted under 35 U.S.C. 154(b) by 130 days.

(21) Appl. No.: 16/799,617

(22) Filed: Feb. 24, 2020

(65) Prior Publication Data

US 2021/0260774 A1 Aug. 26, 2021

(51) Int. Cl.
*B25J 15/00* (2006.01)
*B25J 19/00* (2006.01)

(52) U.S. Cl.
CPC ......... *B25J 15/0028* (2013.01); *B25J 15/009* (2013.01); *B25J 19/0025* (2013.01)

(58) Field of Classification Search
CPC .. B25J 15/0028; B25J 15/009; B25J 19/0025; B25J 15/0253; B65G 47/90
See application file for complete search history.

(56) References Cited

U.S. PATENT DOCUMENTS

| | | | | |
|---|---|---|---|---|
| 4,819,978 | A * | 4/1989 | Scheinman | B25J 13/082 294/119.1 |
| 5,360,249 | A * | 11/1994 | Monforte | B25J 15/0475 294/119.1 |
| 5,562,320 | A * | 10/1996 | Bloomberg | B25J 15/0253 294/119.1 |
| 8,939,487 | B2 * | 1/2015 | De Koning | B25J 15/0475 294/119.1 |
| 9,504,358 | B1 * | 11/2016 | Malin | A47J 43/283 |
| 2001/0028175 | A1 * | 10/2001 | Thompson | B25J 15/026 294/119.1 |
| 2003/0189349 | A1 * | 10/2003 | Risle | B25J 15/0253 294/207 |
| 2004/0086368 | A1 * | 5/2004 | Downs | B65H 29/02 414/741 |

\* cited by examiner

*Primary Examiner* — Stephen A Vu (57) ABSTRACT

A lateral gripper includes a gripper mount, and two gripper jaw modules assembled on the gripper mount. Each gripper jaw module includes a sliding block and a gripper jaw. The sliding block drives the gripper jaw to slide on the gripper mount. The gripper jaw is configured to grip a drill box by multi-point contact, so that the freedom of the drill box is restricted, and the drill box can be stably carried by the gripper jaw modules.

15 Claims, 9 Drawing Sheets

LATERAL GRIPPER

BACKGROUND OF THE INVENTION

1. Field of the Invention

The present invention relates to gripper technology and more particularly, to a lateral gripper, which is designed for use in an automatic handling device to grip a drill box laterally by multi-point contact for delivery.

2. Description of the Related Art

When drills are manufactured, they will be stored in drill boxes and transported using a vacuum suction device. However, the cost of vacuum suction equipment is high, and the industry needs long-term investment to recover the investment cost.

SUMMARY OF THE INVENTION

The present invention has been accomplished under the circumstances in view. It is therefore the main object of the present invention to provide a lateral gripper, which is designed to grip a drill box laterally by multi-point contact, so that the drill box can be stably held and transported. It is another object of the present invention to provide a lateral gripper, which has a simple structure and lightweight and is easy and inexpensive to install.

To achieve these and other objects of the present invention, a lateral gripper comprises a gripper mount, two gripper jaw modules, and a plurality of positioning devices. The gripper mount comprises a transversely arranged linear sliding groove. The two gripper jaw modules are coupled to the linear sliding groove of the gripper mount and drivable by a driving device to move along the linear sliding groove relative to each other between a close position and an open position. Each gripper jaw module comprises a sliding block and a gripper jaw. The sliding block is a T-shaped block, comprising a sliding end and a connecting surface. The sliding end is slidably coupled to the linear sliding groove. The gripper jaw is a L-shaped jaw mounted on the connecting surface. The gripper jaw comprises a mounting portion, an abutment surface and a gripping surface. The mounting portion corresponds to the connecting surface and combines the sliding block with the gripper jaw by fastening means. The abutment surface and the gripping surface are connected at right angles. The gripping surface has a plurality of mounting holes. When the two gripper jaw modules are assembled on the gripper mount, the abutment surfaces and gripping surfaces of the two gripper jaw modules define a gripping space for gripping an object. The positioning devices are symmetrically mounted in the mounting holes on the gripping surfaces of the gripper jaws of the two gripper jaw modules.

DETAILED DESCRIPTION OF THE PREFERRED EMBODIMENT

Referring to FIGS. 1-6, a lateral gripper 100 in accordance with a first embodiment of the present invention is shown. The lateral gripper 100 comprises a gripper mount 1 and two gripper jaw modules 2.

As shown in FIGS. 1-5, the gripper mount 1 is used for the mounting of the two gripper jaw modules 2. The gripper mount 1 comprises a transversely arranged linear sliding groove 11, and a connection unit 12 that has one end thereof connected to a driving device (not shown), and an opposite end thereof connected to the gripper jaw modules 2, so that the driving device can drive the gripper jaw modules 2 to move relative to each other. The driving device can be a hydraulic drive or a pneumatic drive. The driving principle of air pressure or hydraulic fluid pressure is not the scope of the claims of the present invention, so we won't go into details here.

As shown in FIGS. 1-6, the gripper jaw modules 2 are coupled to the linear sliding groove 11 and driven by the driving device to move along the linear sliding groove 11 relative to each other between a close position and an open position. Each gripper jaw module 2 comprises a sliding block 21 and a gripper jaw 22. The sliding block 21 is a T-shaped block, having a sliding end 211 and a connecting surface 212. The sliding end 211 is slidably coupled to the linear sliding groove 11, so that the sliding block 21 can be moved linearly along the linear sliding groove 11. The gripper jaw 22 is mounted on the connecting surface 212. The gripper jaw 22 is a L-shaped jaw, having amounting portion 221, an abutment surface 222 and a gripping surface 223. The mounting portion 221 corresponds to the connecting surface 212 and combines the sliding block 21 with the gripper jaw 22 through a fastening means. The abutment surface 222 and the gripping surface 223 are connected at right angles. The gripping surface 223 has a plurality of mounting holes 224 for mounting at least one, for example, two positioning devices 3. After installation of the gripper jaw modules 2 in the gripper mount 1, the abutment surfaces 222 and gripping surfaces 223 of the gripper jaw modules 2 define a gripping space for gripping an object, i.e., drill box D.

Figure 5:
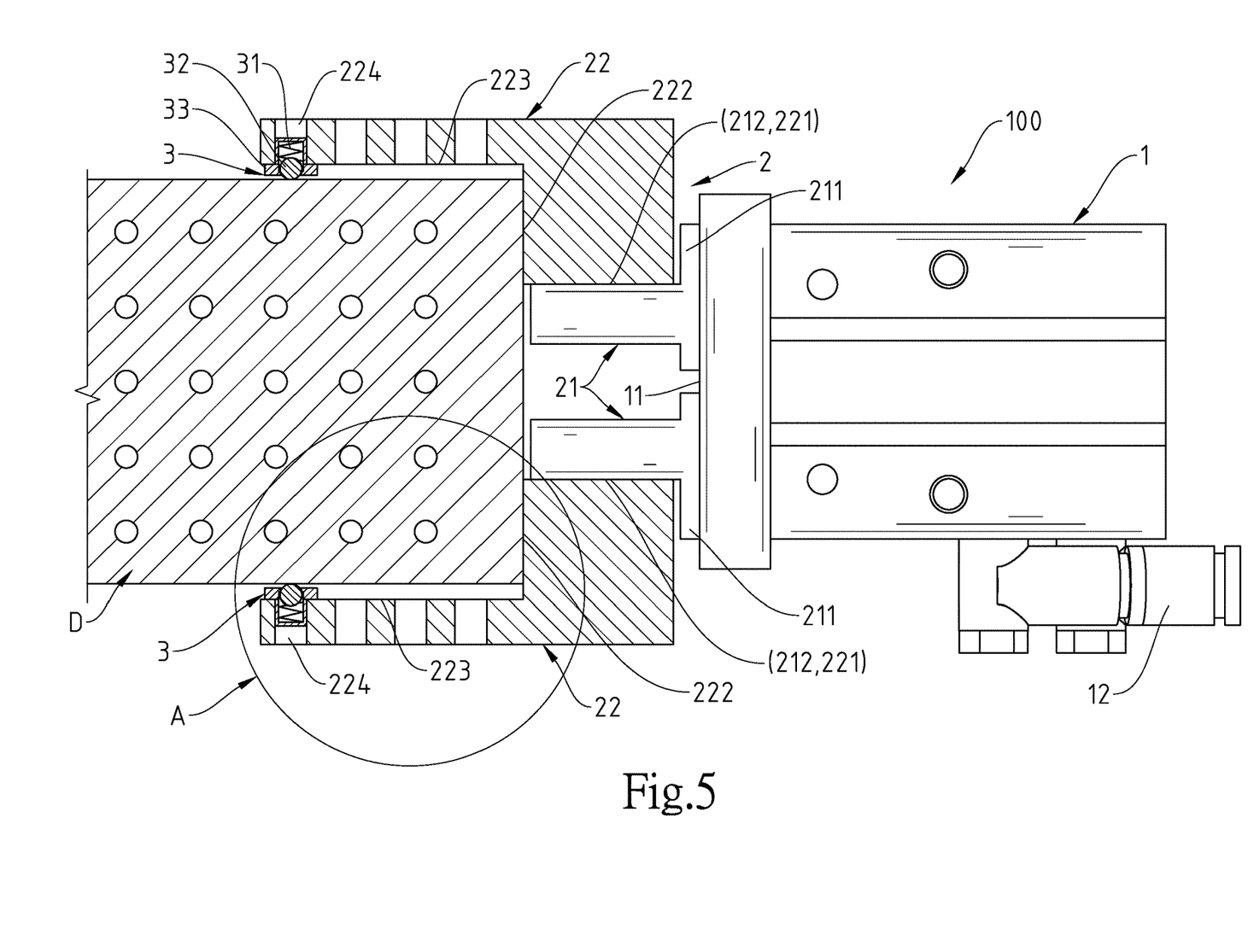
FIG. 5 corresponds to FIG. 4, illustrating the positioning devices attached to the drill box.
Figure 6:
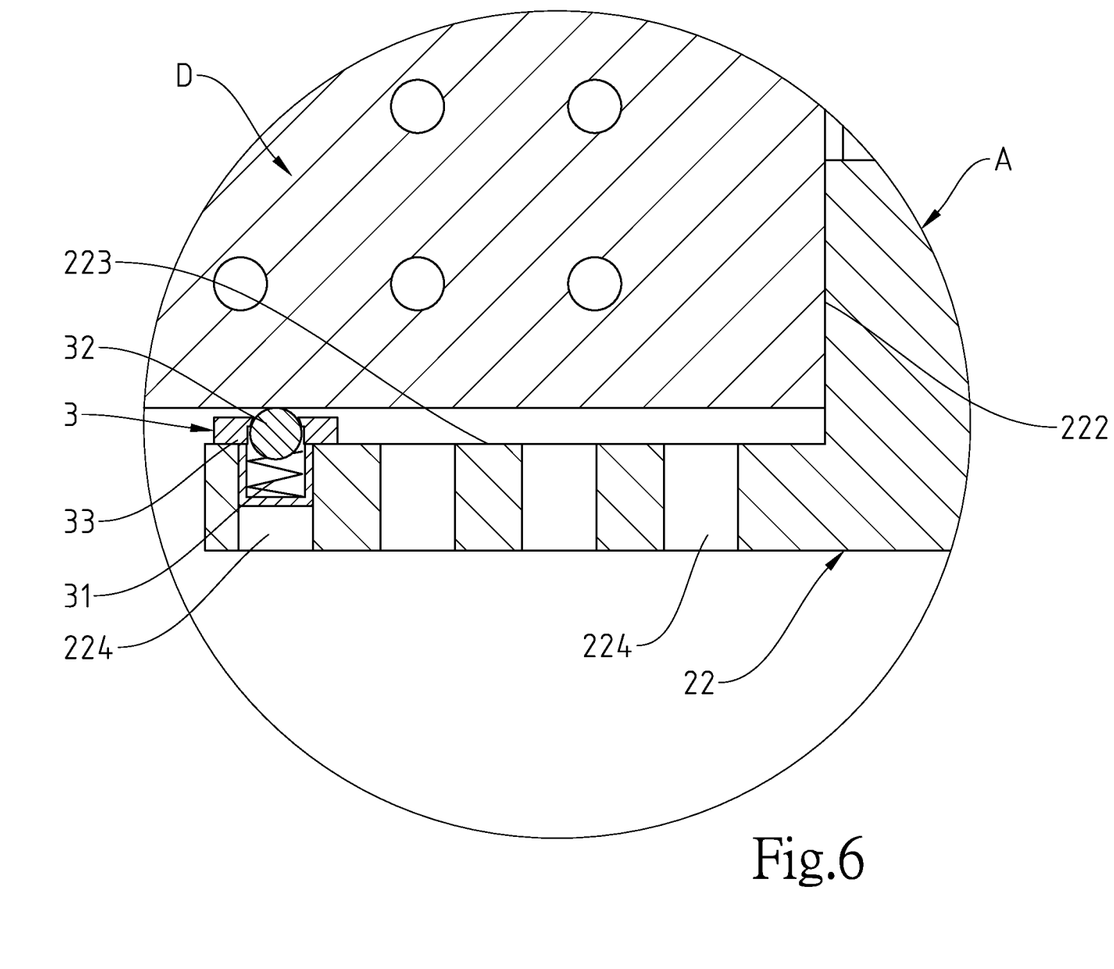
FIG. 6 is an enlarged view of Part A of FIG. 5.

As shown in FIGS. 5 and 6, each positioning device 3 comprises a spring 31, a steel ball 32 and a limiter 33. The spring 31 is mounted in one mounting hole 224. The steel ball 32 is supported on the spring 31 and position-limited by the limiter 33. With the elastic clamping effect of the positioning devices 3, the object is firmly gripped by the gripper jaw modules 2.

Figure 1:
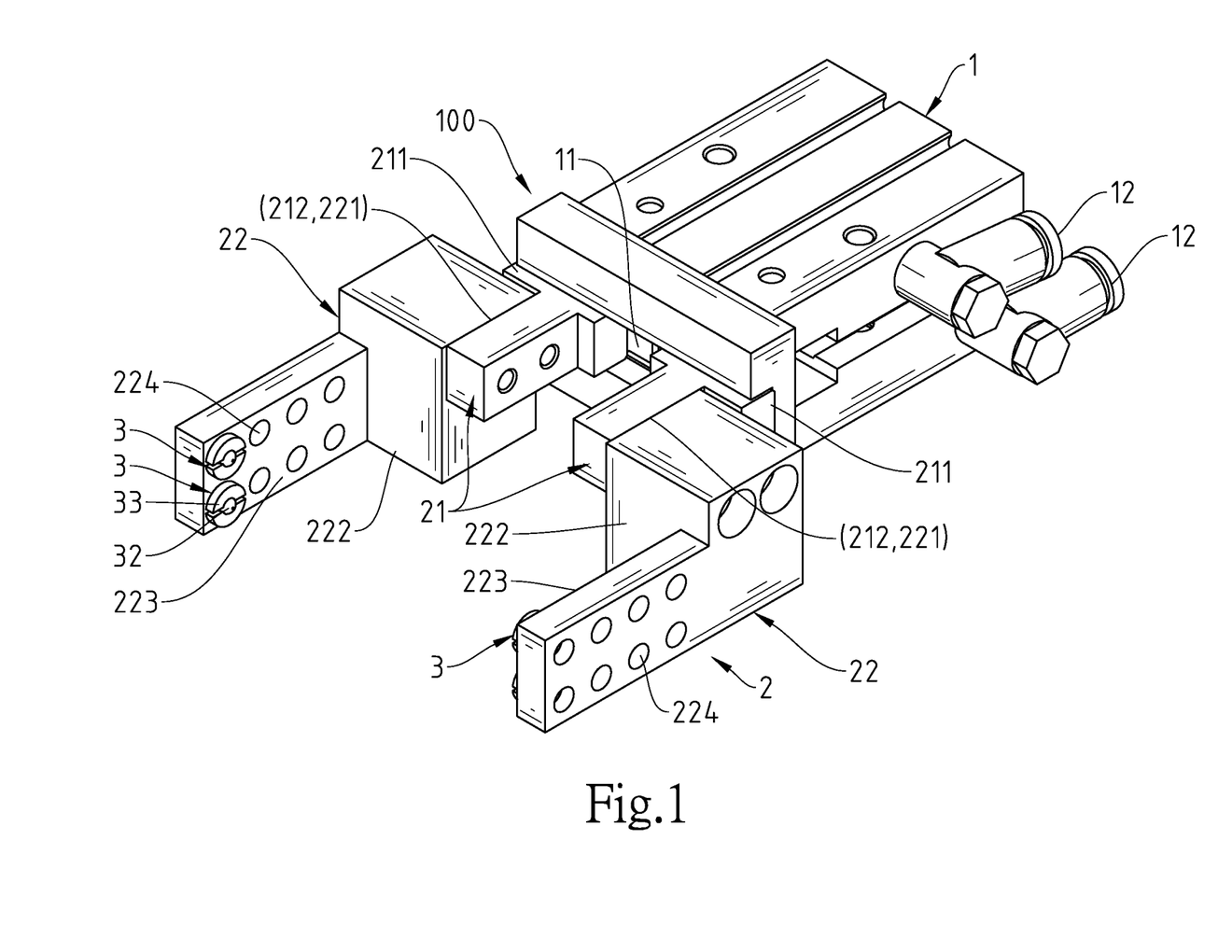
FIG. 1 is an oblique top elevational view of a lateral gripper in accordance with a first embodiment of the present invention.
Figure 2:
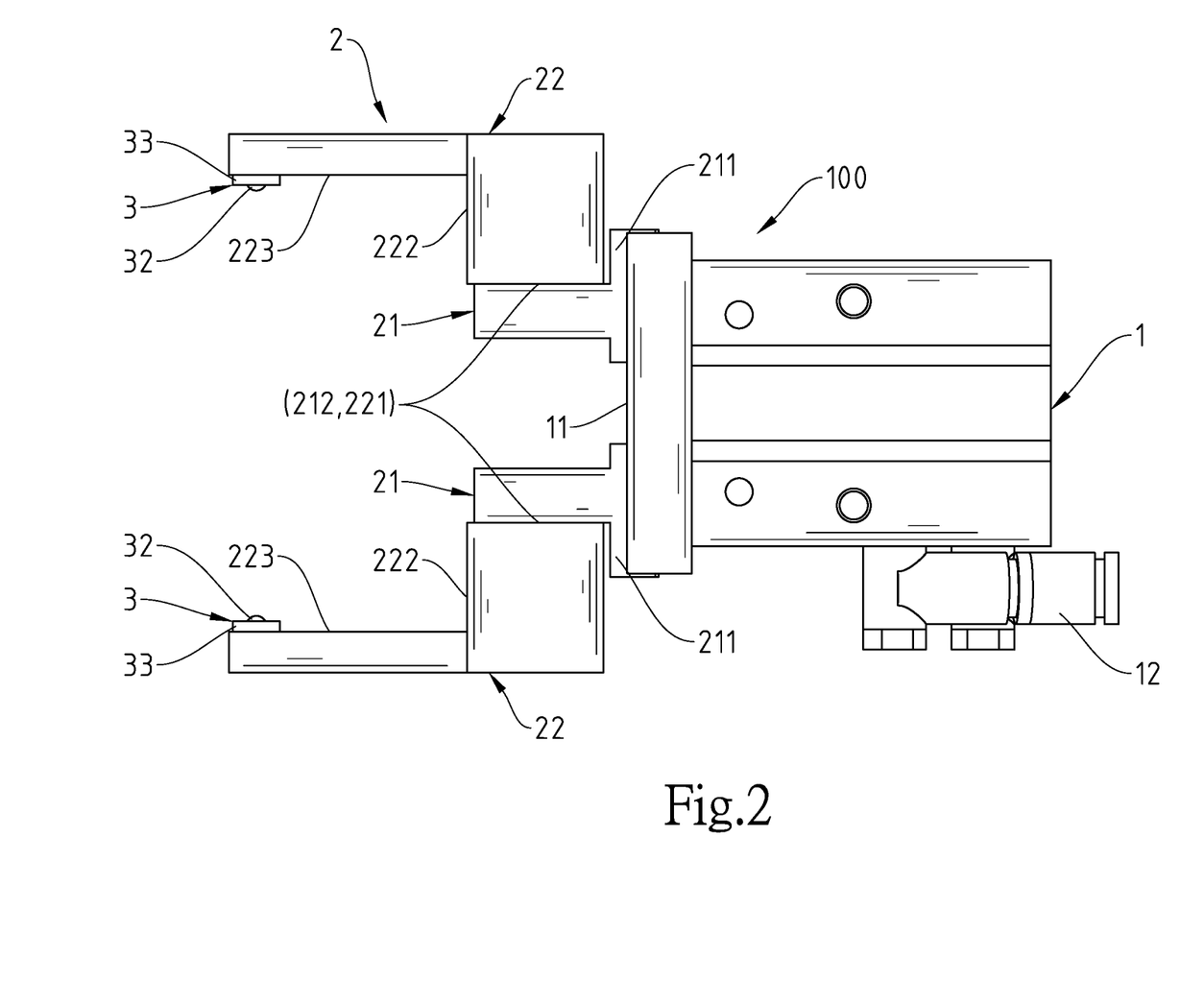
FIG. 2 is a top view of the lateral gripper in accordance with the first embodiment of the present invention.
Figure 3:
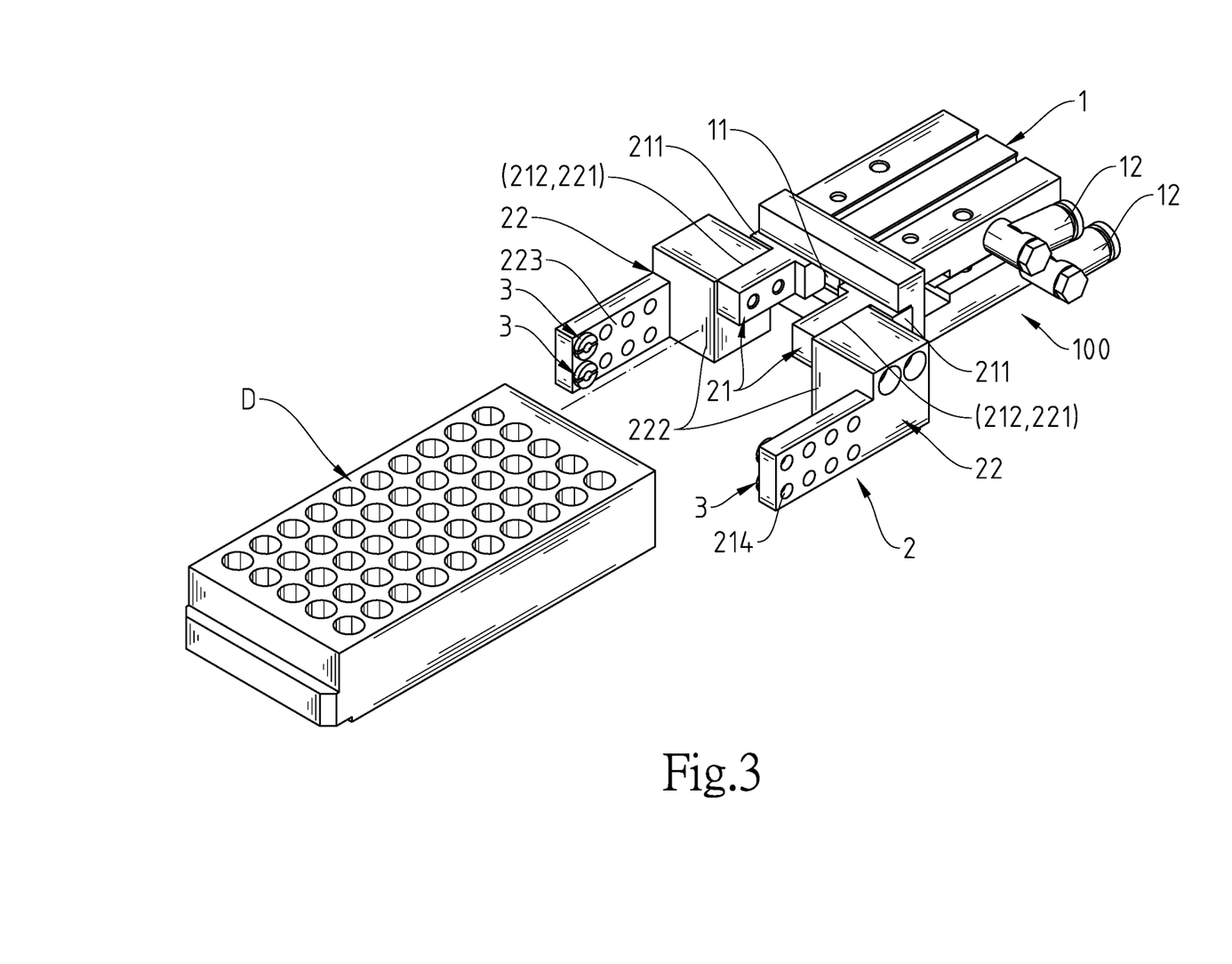
FIG. 3 is a schematic applied view of the lateral gripper in accordance with the first embodiment of the present invention.
Figure 4:
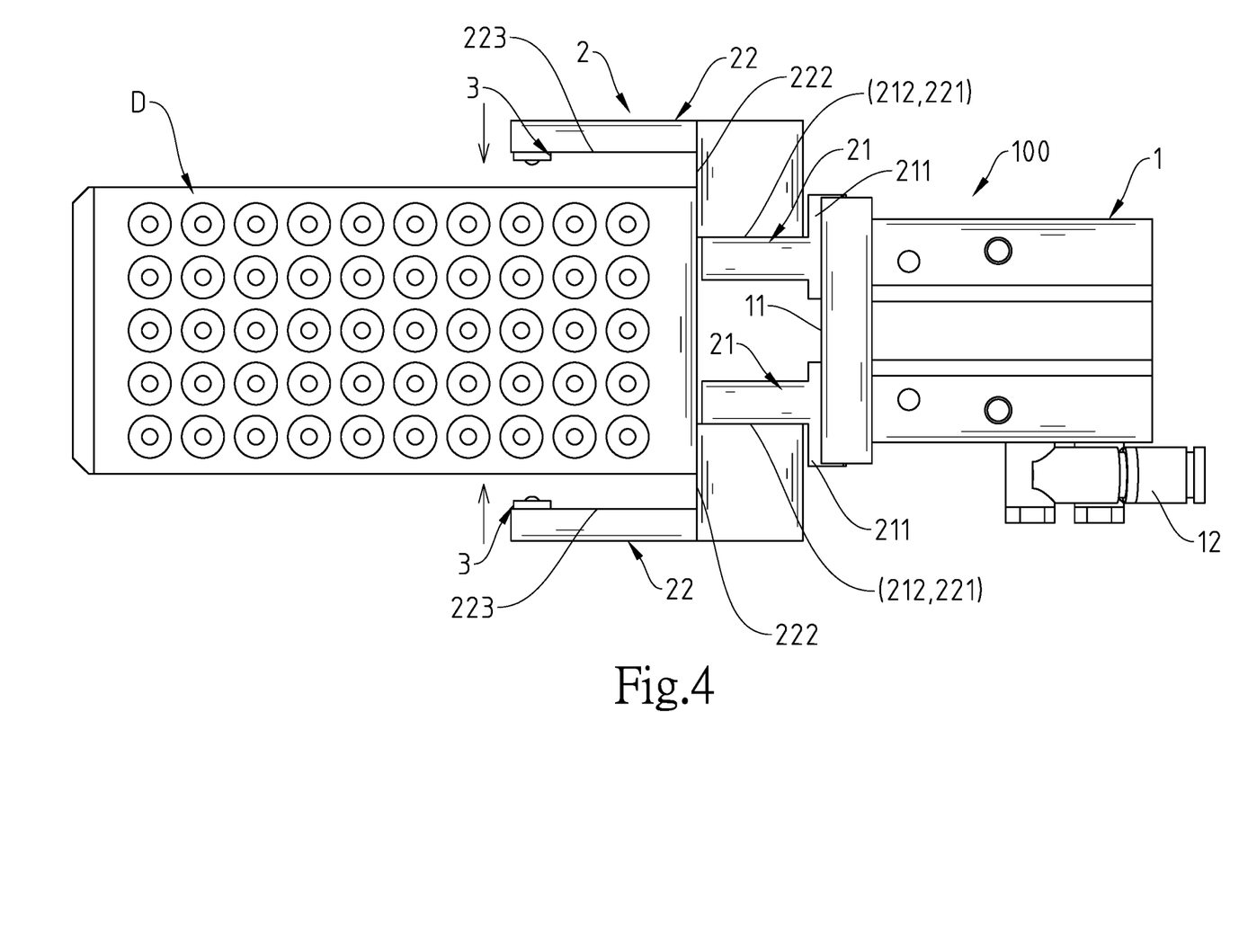
FIG. 4 is a schematic top view of the first embodiment of the present invention, illustrating the drill box entered the gripping space and the gripper jaws moved toward the drill box.

Through the above description, the use of the present invention is shown in FIGS. 3-6. When the drill box D needs to be moved, as shown in FIG. 4, the gripper mount 1 is moved by an automatic handling device (robotic arm) to approach the drill box D, letting the gripping space formed by the abutment surfaces 222 and gripping surface 223 of the gripper jaw modules 2 approach and grip the drill box D, as shown in FIG. 5. Using the positioning devices 3 can firmly grip the drill box D without causing surface damage. In addition to the grip on both sides by the gripping surfaces 223 of the gripper jaw modules 2, the abutment surfaces 222 of the gripper jaw modules 2 further restrict the freedom of the drill box D, keeping the drill box D from falling during transportation. Utilizing the design of the present invention improves the problem of inaccurate delivery of the use of a conventional conveyor to deliver the drill box D and eliminates the need for expensive vacuum suction handling equipment, which greatly reduces the cost of installation.

Figure 7:
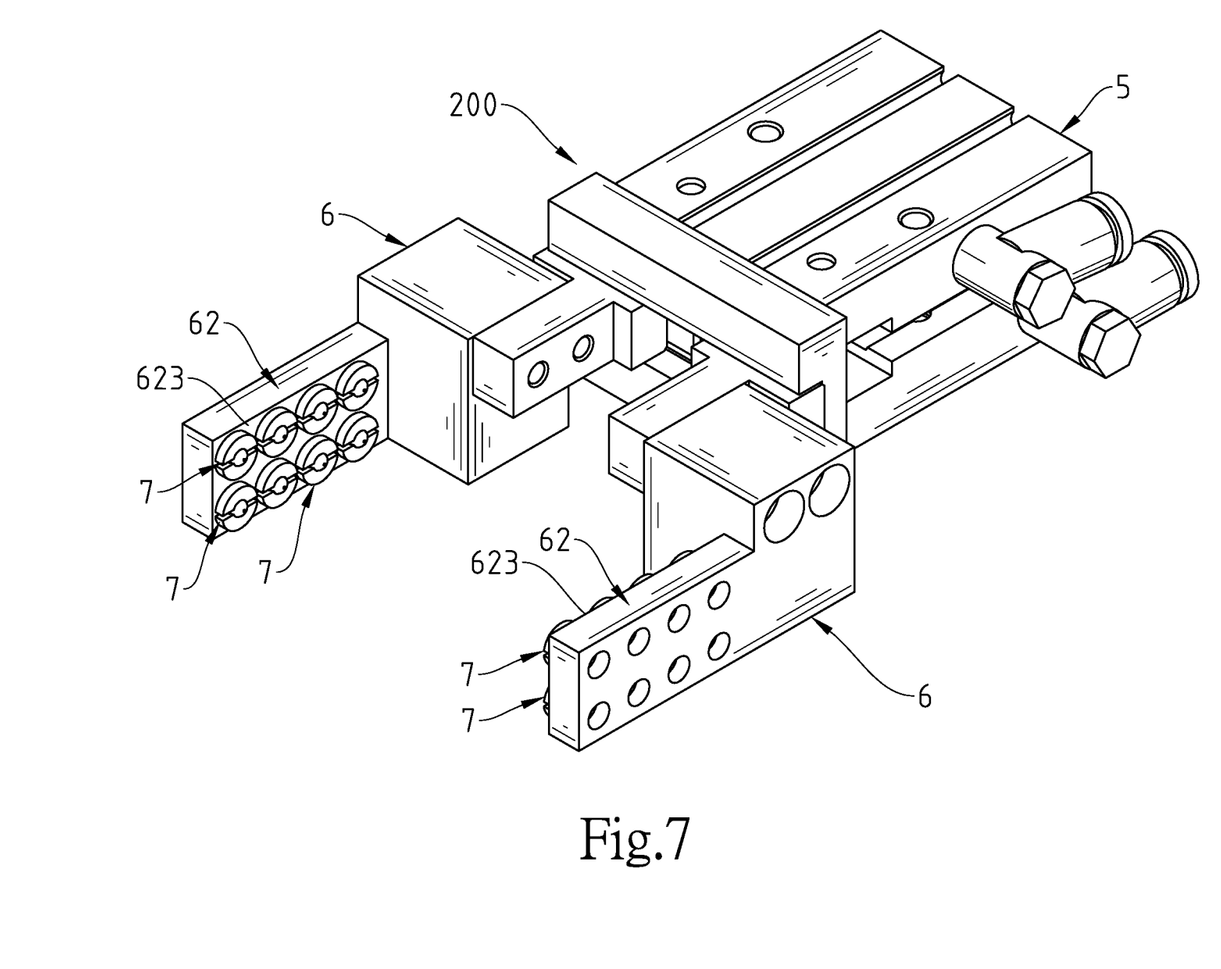
FIG. 7 is an oblique top elevational view of a lateral gripper in accordance with a second embodiment of the present invention.
Figure 8:
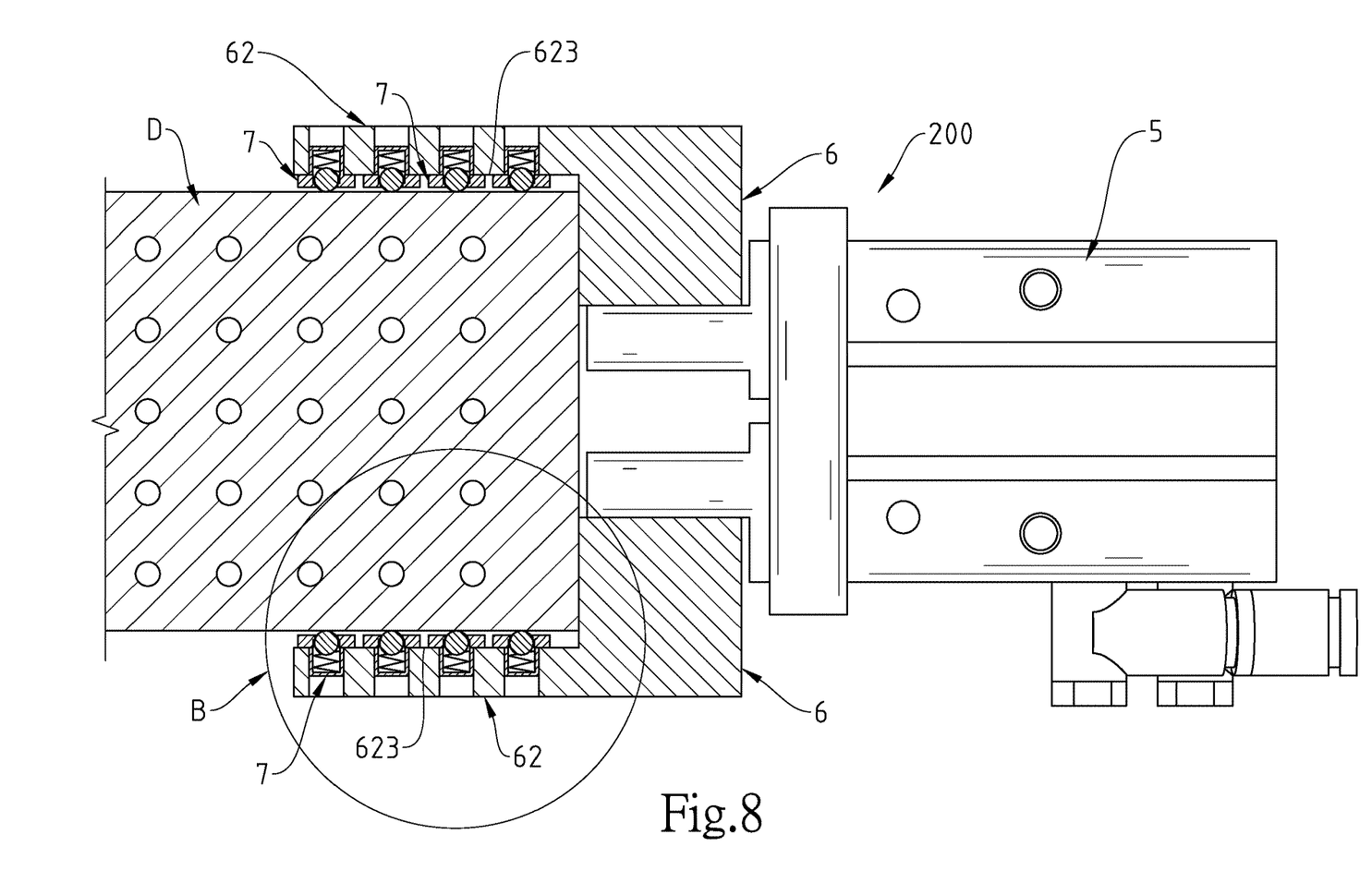
FIG. 8 is a schematic top view of the second embodiment of the present invention, illustrating the drill box entered the gripping space and the positioning devices attached to the drill box.
Figure 9:
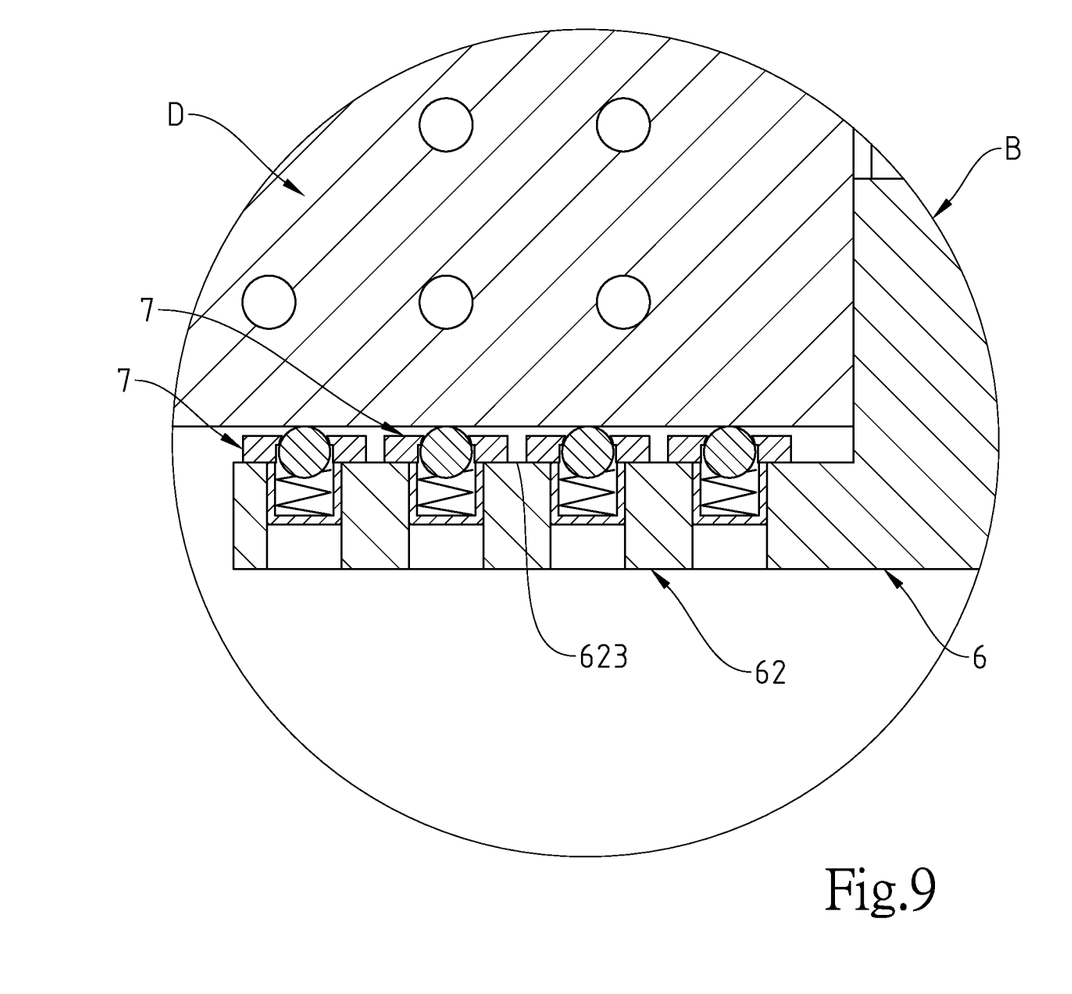
FIG. 9 is an enlarged view of Part B of FIG. 8.

Referring to FIGS. 7-9, a lateral gripper 200 in accordance with a second embodiment of the present invention is shown. As shown in FIGS. 7-9, the basic configuration of the second embodiment is the same as that of the first embodiment and comprises a gripper mount 5 and two gripper jaw modules 6. According to this second embodiment, a plurality of positioning devices 7 are mounted in the gripping surface 623 of the gripper jaw 62 of each of the two gripper jaw modules 6 and arranged in two rows at two different elevations. According to this, when the drill box D is gripped, as shown in FIGS. 8 and 9, the gripping surfaces 623 of the gripper jaws 62 of the two gripper jaw modules 6 and the mounted positioning devices 7 can be completely attached to the surface of the drill box D, and the gripping is more stable.

What is claimed is:

1. A lateral gripper, comprising:
a gripper mount comprising a transversely arranged linear sliding groove;
two gripper jaw modules coupled to said linear sliding groove of said gripper mount and drivable by a driving device to move along said linear sliding groove relative to each other between a closed position and an open position, each said gripper jaw module comprising a sliding block and a gripper jaw, said sliding block being a T-shaped block, said sliding block comprising a sliding end and a connecting surface, said sliding end being slidably coupled to said linear sliding groove, said gripper jaw being an L-shaped jaw mounted on said connecting surface, said gripper jaw comprising a mounting portion, an abutment surface and a gripping surface, said mounting portion corresponding to said connecting surface and combining said sliding block with said gripper jaw by fastening means, said abutment surface and said gripping surface being connected at right angles, said gripping surface comprising a plurality of mounting holes, said abutment surfaces and said gripping surfaces of said two gripper jaw modules defining a gripping space for gripping an object; and
a plurality of positioning devices symmetrically mounted in said mounting holes on said gripping surfaces of said gripper jaws of said two gripper jaw modules;
wherein said gripper mount further comprises a connection unit, said connection unit having one end thereof connected to a driving device and an opposite end thereof connected to said sliding blocks of said two gripper jaw modules for allowing said driving device to drive said blocks of said two gripper jaw modules to move along said linear sliding groove relative to each other between said closed position and said open position.

2. The lateral gripper as claimed in claim 1, wherein each said positioning device comprises a spring mounted in one said mounting hole of one said gripper jaw module, a steel ball supported on said spring, and a limiter for position-limiting said steel ball to said spring.

3. The lateral gripper as claimed in claim 1, wherein a plurality of said positioning devices are mounted in said mounting holes on said gripping surface of said gripper jaw of each of said two gripper jaw modules and arranged in a row.

4. The lateral gripper as claimed in claim 1, wherein a plurality of said positioning devices are mounted in said mounting holes on said gripping surface of said gripper jaw of each of said two gripper jaw modules and arranged in two rows.

5. The lateral gripper as claimed in claim 1, wherein said gripper mount is mounted in an automatic handling device and said an automatic handling device is a robotic arm.

6. A lateral gripper, comprising:
a gripper mount comprising a transversely arranged linear sliding groove;
two gripper jaw modules coupled to said linear sliding groove of said gripper mount and drivable by a driving device to move along said linear sliding groove relative to each other between a closed position and an open position, each said gripper jaw module comprising a sliding block and a gripper jaw, said sliding block being a T-shaped block, said sliding block comprising a sliding end and a connecting surface, said sliding end being slidably coupled to said linear sliding groove, said gripper jaw being an L-shaped jaw mounted on said connecting surface, said gripper jaw comprising a mounting portion, an abutment surface and a gripping surface, said mounting portion corresponding to said connecting surface and combining said sliding block with said gripper jaw by fastening means, said abutment surface and said gripping surface being connected at right angles, said gripping surface comprising a plurality of mounting holes, said abutment surfaces and said gripping surfaces of said two gripper jaw modules defining a gripping space for gripping an object; and
a plurality of positioning devices symmetrically mounted in said mounting holes on said gripping surfaces of said gripper jaws of said two gripper jaw modules;
wherein each said positioning device comprises a spring mounted in one said mounting hole of one said gripper jaw module, a steel ball supported on said spring, and a limiter for position-limiting said steel ball to said spring.

7. The lateral gripper as claimed in claim 6, wherein said gripper mount further comprising a connection unit, said connection unit having one end thereof connected to a driving device and an opposite end thereof connected to said sliding blocks of said two gripper jaw modules for allowing said driving device to drive said blocks of said two gripper jaw modules to move along said linear sliding groove relative to each other between said closed position and said open position.

8. The lateral gripper as claimed in claim 6, wherein a plurality of said positioning devices are mounted in said mounting holes on said gripping surface of said gripper jaw of each of said two gripper jaw modules and arranged in a row.

9. The lateral gripper as claimed in claim 6, wherein a plurality of said positioning devices are mounted in said mounting holes on said gripping surface of said gripper jaw of each of said two gripper jaw modules and arranged in two rows.

10. The lateral gripper as claimed in claim 6, wherein said gripper mount is mounted in an automatic handling device and said an automatic handling device is a robotic arm.

11. A lateral gripper, comprising:
a gripper mount comprising a transversely arranged linear sliding groove;
two gripper jaw modules coupled to said linear sliding groove of said gripper mount and drivable by a driving device to move along said linear sliding groove relative to each other between a closed position and an open position, each said gripper jaw module comprising a sliding block and a gripper jaw, said sliding block being a T-shaped block, said sliding block comprising a sliding end and a connecting surface, said sliding end being slidably coupled to said linear sliding groove, said gripper jaw being an L-shaped jaw mounted on said connecting surface, said gripper jaw comprising a mounting portion, an abutment surface and a gripping surface, said mounting portion corresponding to said connecting surface and combining said sliding block with said gripper jaw by fastening means, said abutment surface and said gripping surface being connected at right angles, said gripping surface comprising a plurality of mounting holes, said abutment surfaces and said gripping surfaces of said two gripper jaw modules defining a gripping space for gripping an object; and
a plurality of positioning devices symmetrically mounted in said mounting holes on said gripping surfaces of said gripper jaws of said two gripper jaw modules;
wherein a plurality of said positioning devices are mounted in said mounting holes on said gripping surface of said gripper jaw of each of said two gripper jaw modules and arranged in a row.

12. The lateral gripper as claimed in claim 11, wherein said gripper mount further comprising a connection unit, said connection unit having one end thereof connected to a driving device and an opposite end thereof connected to said sliding blocks of said two gripper jaw modules for allowing said driving device to drive said blocks of said two gripper jaw modules to move along said linear sliding groove relative to each other between said closed position and said open position.

13. The lateral gripper as claimed in claim 11, wherein each said positioning device comprises a spring mounted in one said mounting hole of one said gripper jaw module, a steel ball supported on said spring, and a limiter for position-limiting said steel ball to said spring.

14. The lateral gripper as claimed in claim 11, wherein a plurality of said positioning devices are mounted in said mounting holes on said gripping surface of said gripper jaw of each of said two gripper jaw modules and arranged in two rows.

15. The lateral gripper as claimed in claim 11, wherein said gripper mount is mounted in an automatic handling device and said an automatic handling device is a robotic arm.

* * * * *